July 13, 1965   G. G. RUMBERGER   3,194,479
CONTAINERS AND CONTAINER CLOSURES
Filed April 16, 1962   3 Sheets-Sheet 1

INVENTOR.
GEORGE G. RUMBERGER
BY
*Grant H. Hueschen*
ATTORNEY

July 13, 1965  G. G. RUMBERGER  3,194,479
CONTAINERS AND CONTAINER CLOSURES
Filed April 16, 1962  3 Sheets-Sheet 2

INVENTOR.
GEORGE G. RUMBERGER
BY
Gordon W. Huescher
ATTORNEY

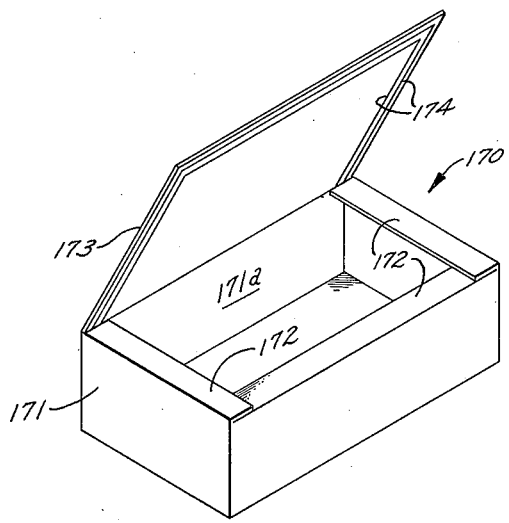
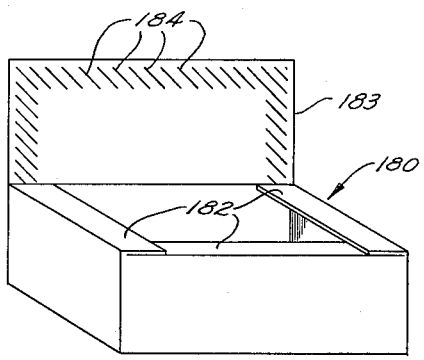
FIGURE 17
FIGURE 18
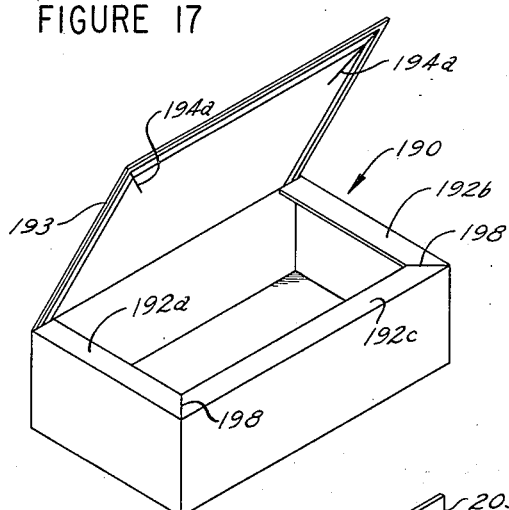
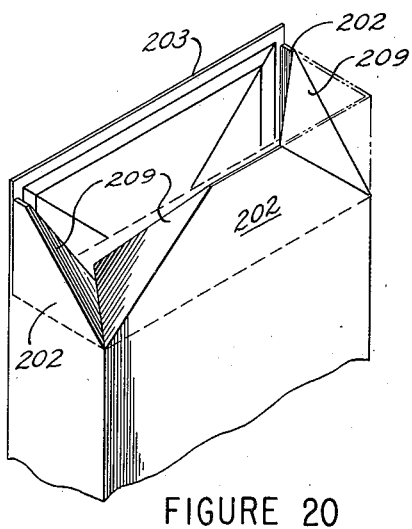
FIGURE 19
FIGURE 20
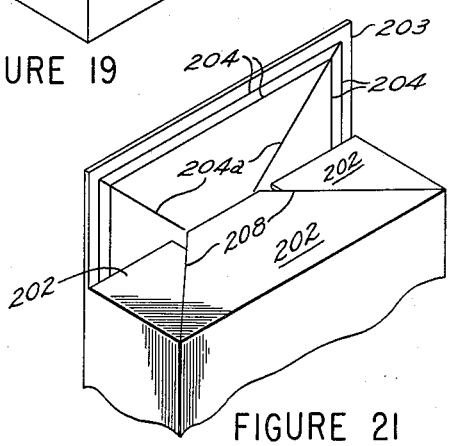
FIGURE 21

United States Patent Office 3,194,479
Patented July 13, 1965

3,194,479
CONTAINERS AND CONTAINER CLOSURES
George G. Rumberger, Portage Township, Kalamazoo County, Mich., assignor to KVP Sutherland Paper Company, Kalamazoo, Mich., a corporation of Delaware
Filed Apr. 16, 1962, Ser. No. 187,592
32 Claims. (Cl. 229—43)

The present invention relates to containers and is more particularly concerned with containers of the type in which a closure member is sealed to a container body by extrusion of a thermoplastic laminant adhesive from the container body or closure member. The instant application is a continuation-in-part of my copending application Serial No. 133,439, filed August 23, 1961. My prior application inter alia discloses a laminated sheet material having sufficient thermoplastic laminant adhesive interposed between the two outer sheets or plies so that it is particularly useful in making carton blanks and cartons which may be sealed by extrusion of the adhesive from cuts or slits provided in closure members. The present invention utilizes such type of laminated sheet material and relates in particular to containers having a closure member which is sealed to the container body by extrusion of adhesive from the container body or closure member in the closure member edge, e.g., peripheral or circumferential, areas.

Many types of containers provided with detachable and articulated closure members are currently available. In general, they may be divided into two categories—containers which may be sealed without the employment of additional adhesive and containers which cannot be sealed unless the sealing areas are coated with adhesive. Containers which may be sealed without employment of additional adhesive are sometimes referred to as self-sealing containers. Such containers are provided with an adhesive surface during the fabricating operation, as by the surface application of hot melts, lacquers, latices, organosols, and the like, and are generally preferred to other containers since filling and sealing thereof may be performed in a simple and facile manner. In some instances, to prevent the adhesive surfaces of one empty container, comprising a closure member and a container body, from adhering to another empty container while they are being stacked and shipped, protective material may overlie the adhesive surface, but must be readily removable therefrom prior to sealing of the closure member to the container body. Such protective material presents many problems and also increases the cost of the container.

In the packaging of many materials it is desirable to have a cover member which is highly protective and which can be readily sealed to a container body member. Although the desirability of having a laminated sheet for a cover, especially one laminated with a moisture or gas proof thermoplastic, has long been recognized, it has not been possible to provide such a closure member using the common topical applications as cited above due to delamination of the sheet material or other factors contributing to the loss of its protective properties.

Thus, the need for a container having a container body and closure member which may be sealed to each other in a simple and facile manner has long been recognized. This need has become more acute during the past decade since many advantages are attainable by packaging foodstuffs and the like in containers, such as these formed from paper, plastic, metal, glass, ceramics, and the like. As a consequence, the packaging industry has been confronted with the problem of supplying containers which may be sealed in a simple and facile manner and which will remain sealed until opened by the consumer. This problem has not been adequately solved up to the present.

Accordingly, it is an object of the present invention to provide a container having an improved seal between the closure member and the container body, in which at least one of said closure member and container body is of laminated sheet material.

An additional object is to provide an edge-sealing container in which either the container body or closure member or both are of laminated sheet material.

Another object of the invention is to provide a laminated closure member with a circumferential slit in at least one ply thereof from which a thermoplastic laminant adhesive is extruded for sealing the closure member to the bearing edge of a container body, and the combination of such closure member with such container body.

A further object of the invention is to provide a container having a container body constructed of laminated sheet material in combination with a container closure member, said closure member being sealed to said container body at a bearing edge of said container body by thermoplastic laminant adhesive extruded through a circumferential slit or cut in the inner ply of said container body.

A still further object is the provision of a container having a container body and a closure member, in which said closure member nests upon a bearing edge of said container body and is secured thereto by means of thermoplastic laminant adhesive extruded outwardly from the cut edge of said container closure member peripherally or circumferentially.

Still another object is the provision of a container having a container body and a container closure member, whether or not articulated thereto, and wherein the closure member is provided with one or more slits in its inner ply in the edge areas thereof, said closure member being of laminated sheet material and having such slits in said edge area extending circumferentially along unarticulated sides thereof.

Still an additional object of the invention is the provision of a container having a container body and a container closure member, said container body having a bearing edge for support of said closure member, and said closure member being constructed of laminated sheet material and being provided with an avenue or path of exit of the thermoplastic adhesive laminant to the bearing edge of said container body or an extension thereof, for sealing said closure member to said body member in the edge areas thereof upon the application of thermoplastic laminant adhesive activating conditions.

Another object is the provision of a container having a container body and a closure member in sealing engagement therewith, one of said members being of laminated sheet material containing a sufficient amount of thermoplastic adhesive laminant between its plies to extrude through avenues of exit and into areas of contact with the other container member, i.e., into areas of sealing engagement, upon application of thermoplastic adhesive laminant activating conditions.

It is another object of the present invention to provide a laminated closure member with a slit or slits in the edge areas of a ply or plies thereof for extrusion of thermoplastic laminant adhesive through one or both sides of the closure member and into contact with a container body when in sealing engagement therewith, and the combination of such container body and closure member.

It is still another object to provide a laminated closure member with one or more slits in unarticulated edge areas thereof through which slit or slits thermoplastic laminant adhesive is extruded for sealing the closure member to a bearing edge of the container body, and the combination of such container body and closure member.

It is a still further object of the present invention to provide a laminated closure member with a diagonal slit at each of its unarticulated corners in registry with the junctures of underlying flaps, and containers embodying the same.

Yet another object of the present invention resides in a container having a closure member sealed thereto by extrusion of thermoplastic laminant adhesive in the closure member edge areas, whether circumferentially, peripherally, or through one or more slits or cuts in the said edge areas.

Still a further object of the present invention is to provide a container with a self-gasketed locked-in closure member.

Other objects and advantages of the present invention will be apparent to one skilled in the art and still other objects of the invention will become apparent hereinafter.

The present invention, therefore, is concerned with containers in which either the container body or the closure member, or both, are of laminated sheet material, and which are or may be sealed in the edge areas of said closure member by the extrusion of thermoplastic laminant adhesive from either the closure member, when of laminated sheet material, or the container body, when it is constructed of laminated sheet material. Whichever of the members, that is, the closure member or the body member, is constructed of laminated sheet material, comprises at least two plies of sheet material bonded together by a thermoplastic laminant adhesive. One or both of the outer plies of the laminated sheet material are provided with one or more slits in the edge areas thereof through which thermoplastic laminant adhesive may be extruded upon application of heat, heat and pressure, or even pressure alone in some cases. Alternatively, the raw cut edges of either the closure member, or container body, whichever is constructed of laminated sheet material, may serve alone or together with slits or cuts in the edge areas as an avenue or path of exit of the thermoplastic adhesive laminant. The closure member, whether or not articulated along one side thereof, upon container closure, usually rests against a bearing edge provided as a part of the container body. An extension of such bearing edge may extend upwardly in juxtaposition to the cut edge of a container closure member. Upon the application of thermoplastic laminant adhesive activating conditions with closure member in place, either at the edge areas of the closure member itself if of the laminated sheet material, or at the outside of said container body opposite the edge area of the closure member especially when the container body is constructed of laminated sheet material, but even when the closure member is constructed of laminated sheet material, the thermoplastic laminant adhesive is effectively extruded either outwardly of the cut edges of the closure member and into contact with a wall, bearing edge, or extension of a bearing edge of the container body, or downwardly through openings, e.g., slits or cuts located in the ply of the closure member in juxtaposition to a bearing edge of the container body, or through both plies of the container closure member and into contact with a bearing edge of the container body as well as into contact with a turned over or crimped edge of the container body, or through a combination of the cut edge and peripheral, circumferential, or other slits in one or more of the plies of the closure member which are located in the edge areas of said closure member. Upon congealment or setting of the thermoplastic adhesive, an effective seal is provided between the closure member and the container body. When it is the container body rather than the closure member that is constructed of laminated sheet material, one or more slits or cuts may be provided in the edge areas adjacent a bearing edge of said container, if any, from which thermoplastic laminant adhesive may be extruded into contact with the closure member at the edge areas thereof for sealing of said closure member to said container body upon the application of thermoplastic adhesive laminant activating conditions, as to the exterior of said container body opposite the edge areas of said closure member. Depending upon the material of construction of the container body and closure member, the container may or may not be hermetically sealed, but in any event it is possible if desired to effect a hermetic seal of the container. In the foregoing manner, according to the invention, it is now for the first time possible to provide effectively sealed, and if desired hermetically sealed, containers of the type already indicated, in which the container closure member is sealed at its edge areas to the container body, i.e., in the areas of sealing engagement, by means of self-contained laminant adhesive to provide sanitary, tamper-proof, protective, and composite containers, which may nevertheless be readily opened at will.

For a better understanding of the present invention, reference may be had to the accompanying drawings wherein the parts are numbered, the same numbers are used to refer to the corresponding parts throughout, and wherein:

FIGURE 17 is an isometric view of a container provided with an articulated closure member;

FIGURES 18 and 19 show different embodiments of a container provided with an articulated closure member; and FIGURES 20 and 21 show still another embodiment of a container provided with an articulated closure member showing the flaps in various stages preparatory to sealing the closure member to the bearing edge of the container body.

Figure 1:
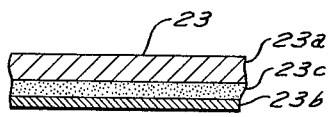
FIGURE 1 is an enlarged fragmentary vertical section of a laminated sheet material employed in the present invention.

Referring now to the drawings, FIGURE 1 is an enlarged cross-sectoinal view of a portion of a laminated sheet material 23 utilizable according to the invention, as it might be formed by laminating a fifty pound per ream (24 x 36 x 500) 0.0035 inch thick dry waxed paper sheet 23b to a .012 inch thick paperboard sheet 23a with .0065 inch of thermoplastic laminating adhesive 23c.

Figure 2:
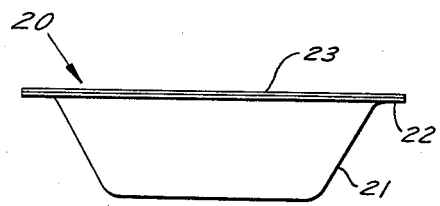
FIGURE 2 is a front elevational view of a container embodying the present invention.
Figure 4:
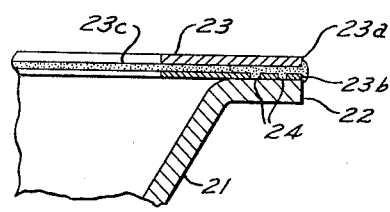
FIGURE 4 is an enlarged fragmentary vertical section taken along line IV—IV of FIGURE 3 to show in detail the seal between the laminated closure member and the container body.

Referring now to FIGURE 2 of the drawings, there is illustrated a container, generally indicated at 20, which comprises a container body 21, including an outwardly extending peripheral rim or flange 22, forming a bearing edge to support closure member 23, shown in sealing engagement therewith. As best viewed in FIGURES 1 and 4, closure member 23 comprises two plies of sheet materials 23a and 23b laminated together with thermoplastic laminant adhesive 23c.

Although the closure member 23 is fabricated of laminated material while the container body 21 is fabricated of unlaminated material, the materials can be reversed. I prefer to employ a laminated closure member in the majority of embodiments shown herein since such construction generally results in a more economically sealed container provided with the same preferred type of characteristics, and allows for choice of a body structure from a wide variety of structural and protective materials.

The laminated sheet material employed in the container or in the closure member, or in both according to some embodiments, contains sufficient thermoplastic laminant adhesive so that, upon application of thermoplastic laminant adhesive activating conditions to the edge areas of the container closure, as where such upon closing of the container abuts the bearing edge of the container, extrusion of the thermoplastic laminant adhesive from the cut edges of the closure member or container constructed of such laminated sheet material, and through any interstices, such as cuts of the like, or a single cut, provided in the edge areas of the closure member or the container itself, results.

The laminated sheet material employed usually contains at least about fifty-five pounds and preferably greater amounts of thermoplastic laminant adhesive 23c per standard 24 inches by 36 inches by 500 sheet ream of the laminated sheet material 23. This permits unprecedented sealing characteristics. In addition, the plies 23a and 23b of the laminated sheet material 23 have a porosity of a least five and preferably ten seconds. This permits the desired extrusion and allows scoring or drawing and provision of the necessary openings, e.g., slit or slits, without fragmentation. This basic combination appears to be fundamental for adequate heat-sealing of the containers to their closure members or vice versa.

I have found it necessary to use sheets having a porosity, as defined by the air resistance test of TAPPI (Technical Association of the Pulp and Paper Industry) method T460 M-49, of at least five seconds and preferably ten seconds or above. By contrast, I have found that porous tissues, or like open sheets having a porosity value of less than one and seldom greater than two seconds, cannot be used.

I have also found porous tissues lacking in the strength necessary to withstand scoring and subsequent folding or drawing, and my thinnest paper sheets are therefore generally chosen with a Mullen dry burst strength of ten or above, and preferably fifteen or above, as determined by TAPPI procedure T403. However, strength may not be critical, and is generally not as critical as porosity, especially when stretchable materials such as creped papers, or plastic films such as polyethylene or polyvinyl chloride films, are used as the thinnest ply of laminated sheet material.

The requisite openings, interstices, or apertures in one or both of the plies of the closure member or container body may be and preferably are one or more slits or cuts in the edge areas and/or openings in the raw cut edges thereof, and their disposition may be either wholly or partly longitudinal, transverse, diagonal, circumferential, or the like.

For the purpose of sealing closure member 23 to the bearing edge formed by the peripheral flange 22 of the container body 21, a circumferential slit or slits 24 (see FIGURE 4) are provided in the edge areas of ply 23b. Containers which are not subjected to much abuse may be provided with a closure member having a single circumferential slit. After the continer body 21 is filled, closure member 23 is placed in sealing engagement therewith. (Sealing engagement is also shown in FIGURES 2, 4, 5, 8, 9, 12, 13, 14 and 16, for example.) The amount of thermoplastic adhesive bonding the several plies or laminations is sufficient so that upon application of adhesive activating conditions, e.g., by applying suitable heat or heat and pressure, as with an appropriate sealing iron or by microwave heating or the like, to the edge areas of the closure member, a small amount of thermoplastic laminant adhesive 23c is extruded through the slits 24 against the bearing edge of peripheral flange 22 of container body 21, sealing the closure member 23 thereto upon setting of the adhesive. Extrusion of the adhesive 23c may also be effected solely by heat to raise the temperature thereof beyond incipient tackiness, but a more rapid and effective seal is generally obtained if both heat and pressure are employed.

As the adhesive 23c is extruded through the slits 24, some of the adhesive is also extruded out of the openings in the cut ends of the closure member 23 for effectively sealing the raw cut edges of the outer plies. Thus, with this type of seal, the closure member 23 can be hermetically sealed to an imprevious container body, and wicking of vapors or liquids through the cut edges precluded. With porous container bodies, an effective seal is thereby provided.

To improve salability of the contents of the container, that is, to enable the buyer to select the contents as to appearance, quality, color, or the like, a closure member for a container body may be provided with a transparent window. By providing an aperture in the central portion of the plies 23a and 23b of the closure member 23, certain thermoplastic laminant adhesives 23c, which are non-tacky at ambient temperatures and substantially transparent, may serve as a window. With such an arrangement, an economical window-type closure member is made available since the adhesive 23c is also employed for sealing the closure member to the container body 21.

When it is desired to secure a window exhibiting different properties than those obtainable with the laminant adhesive 23c, a separate sheet of material 35 (see FIGURE 5) such as glassine, cellophane, vinyl film, polystyrene, cellulose acetate, or the like, may be secured to a closure member 33 as by extrusion of adhesive 33c through a circumferential slit 34 encircling the aperture or window opening therein, or by other suitable adhesive on their surfaces.

The laminated sheet material removed from the sheet in providing the window opening area may be conveniently used for other smaller lids for other containers. A tearout window cover may be provided by perforating the boundary of an area in cover 23 or 33 and allowed to remain superimposed over the window, as for protection during shipping, imprinting, storage, etc., which tearout is kept intact until removed at the point of sale.

Figure 6:
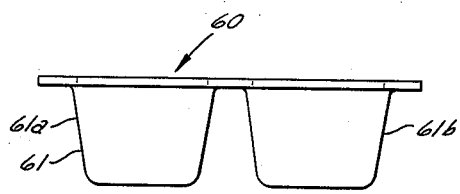
FIGURE 6 is a front elevational view of a multi-chambered container having tear-out sections.
Figure 7:
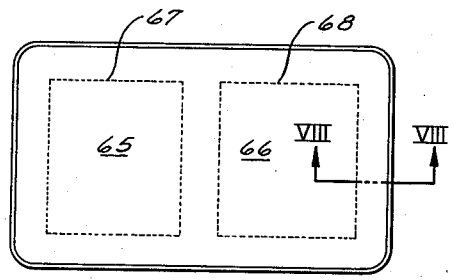
FIGURE 7 is a top plan view of the container shown in FIGURE 6.
Figure 3:
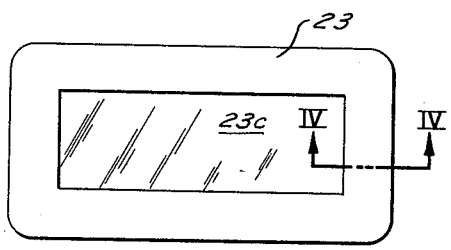
FIGURE 3 is a top plan view thereof.
Figure 8:
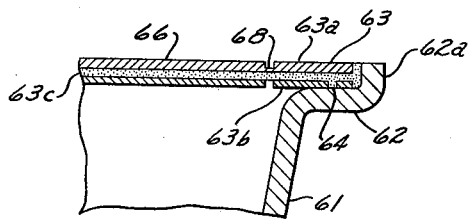
FIGURE 8 is an enlarged fragmentary vertical section taken along line VIII—VIII of FIGURE 7.

In FIGURES 6 through 8 inclusive is shown another form of the invention. Referring to FIGURE 6, a container, generally indicated at 60, comprises a container body 61 provided with two chambers 61a and 61b which may be filled with the same or different contents. Container body 61, as shown in FIGURE 8, includes an outwardly extending top peripheral flange 62 having an upended skirt 62a. Laminated closure member 63 is supported by the bearing edge formed by peripheral flange 62 and is properly aligned by the upended skirt 62a. The closure member 63 includes two outer sheets 63a and 63b laminated together with a thermoplastic laminant adhesive 63c. The edge areas of ply 63b are provided with a single circumferential slit 64 through which is extruded, upon application of adhesive activating conditions, sufficient thermoplastic laminant adhesive 63c for sealing the closure member 63 to the bearing edge formed by flange 62. When desired, ply 63b of closure member 63 may be provided with a centrally disposed transverse slit employed for extruding adhesive 63c for sealing off chamber 61a from chamber 61b. Thermoplastic laminant adhesive 63c is also extruded through cut edges of closure member 63 against the inner face of the skirt 62a for increasing the sealing area of the adhesive as well as preventing wicking through the end thereof.

Figure 9:
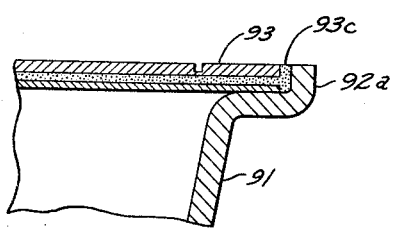
FIGURE 9 is an enlarged fragmentary vertical section similar to FIGURE 8 showing another embodiment of the present invention.
Figure 5:
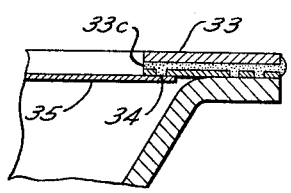
FIGURE 5 is an enlarged fragmentary vertical section similar to FIGURE 4 showing another embodiment of the invention.

For removal of contents from one of the chambers after the container 60 has been sealed, closure member 63 may be provided with tearout sections 65 and 66 defined by lines of severance or weakening 67 and 68 respectively. Depending upon the thickness and strength of the thermoplastic laminant adhesive 63c, the lines of severance may either extend thereto or else a thin web may be allowed to remain in outer ply 63a for joining tearout sections to the periphery of closure member 63. If ply 63b is sufficiently thin, it need not be perforated but may be left intact, and will be torn upon removal of top ply 63a when the tearout is removed as a cohesive unit. Such a construction is shown in FIGURE 9.

In the sealing of some containers, it may be unnecessary to employ a closure member having a circumferential or other edge area slit since extrusion of the thermoplastic laminant adhesive from the cut edges of the closure member effects a sufficient seal when in contact with a skirt or other suitable portion of the container body. This form of the invention is illustrated in FIGURE 9 of the drawings wherein the closure member 93 is sealed to the container body 91 only by extrusion of thermoplastic laminated adhesive 93c from the cut edges thereof against the inner face of the bearing edge extension 92a.

Figure 10:
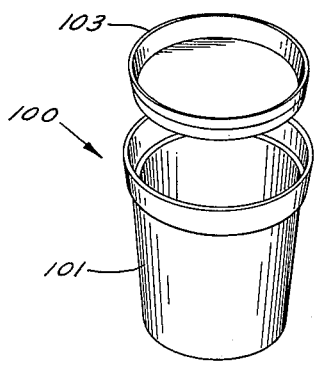
FIGURE 10 is a front perspective view of a substantially cylindrical container.
Figure 11:
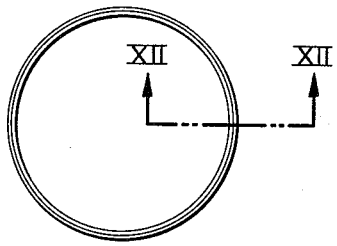
FIGURE 11 is a top plan view of the container shown in FIGURE 10 assuming that the closure member is in sealing engagement with the container body.
Figure 12:
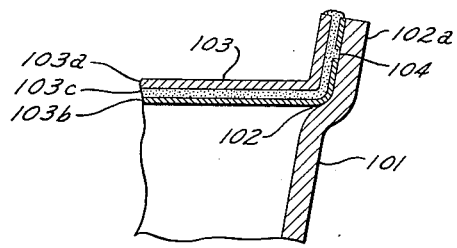
FIGURE 12 is an enlarged fragmentary vertical section taken along line XII—XII of FIGURE 11.

Another form of the invention is shown in FIGURES 10 through 12. As best shown in FIGURE 10, a container, generally indicated at 100, comprises a substantially cylindrical container body 101 having a leakproof or other bottom suitably secured thereto or integral therewith. The container body 101 may also be of the inverted truncated cone shape, or any other conventional construction or form.

For the purpose of supporting a closure member 103 in the container body 101, the upper portion thereof is provided with an annular ridge 102 (see FIGURE 12). A concentric skirt 102a extends upwardly from the outer periphery of ridge 102 and aligns closure member 103 with the rim 102a and the container body 101. Both skirt 102a and ridge 102 form bearing edges for support of closure member 103. Closure member 103 is of laminated construction, having plies 103a and 103b laminated together by a thermoplastic laminant adhesive 103c. The edge areas of the closure member are upended to obtain a snug fit between concentric skirt 102a and the closure member 103. Such construction may provide a good frictional seal for closing the container after a portion of the contents have been removed, or when a container is reused for storing leftovers or the like, provided minimal adhesive is used to effect the initial seal.

To provide an effective seal between closure member 103 and container body 101, a circumferential slit 104 is disposed in the outer ply 103b through which is extruded, upon application of adhesive activating conditions, sufficient thermoplastic laminant adhesive 103c to seal closure member 103 to container body 101. As is apparent from FIGURE 12, the insertion of closure member 103 into container body 101 is limited by annular ridge 102. The seal may be hermetic if desired.

Figure 13:
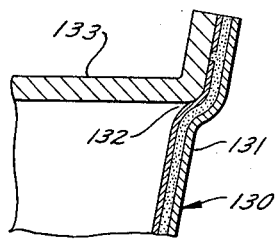
FIGURE 13 is an enlarged fragmentary vertical section similar to FIGURE 12 showing another form of the invention.

FIGURE 13 shows an embodiment of the same general construction as described for FIGURES 10 through 12, including an annular ridge 132 for supporting and limiting insertion of a closure member 133 into a container generally indicated at 130. The main difference is that the container body 131 is of laminated material while the closure member 133 is of unlaminated material. Although ridge 132 forms a bearing edge for closure member 133, the closure member also forms a bearing edge, as for applying sealing means from outside the container. A seal is effected by extrusion of adhesive from a circumferential slot in the edge area of the container body upon application of adhesive activating conditions.

Figure 14:
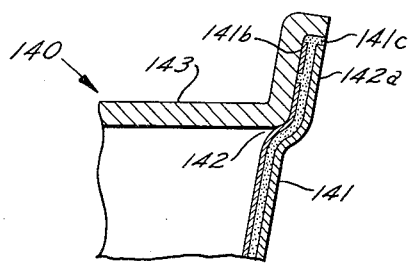
FIGURE 14 is an enlarged fragmentary vertical section similar to FIGURE 13 showing still another form of the invention.
Figure 15:
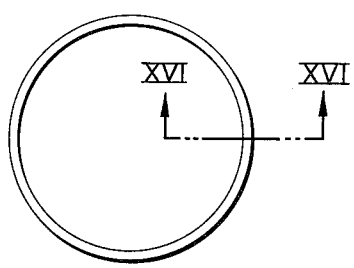
FIGURE 15 is a top plan view of a container provided with a locked-in closure member.

In FIGURE 14, a container generally indicated at 140 is substantially the same as the container 130 shown in FIGURE 13 including a ridge 142 for supporting and limiting insertion of a closure member 143 into container body 141. In this embodiment, the upper portion of the closure member 143 is turned outwardly to provide an additional sealing area and to allow container body 141 to provide a second bearing edge. Outer ply 141b of container body 141 is provided with a circumferential slit in concentric skirt 142a thereof for extrusion of thermoplastic laminant adhesive 141c against the inner face of the upended edge area of closure member 143. Additional thermoplastic laminant adhesive 141c is extruded out of the cut edge of the container body wall against the adjacent surface of the outwardly turned portion of the closure member, thereby providing a double seal between closure member 143 and container body 141.

With each of the embodiments described heretofore, a closure member is placed on or inserted into a container body and sealed to a bearing edge thereof without locking the closure member to the container body or vice versa. Such constructions enable foodstuffs, produce, or the like to be sealed in containers in a simple and facile manner since the only apparatus necessary is, for example, an appropriate sealing mechanism. For other applications of the invention, however, it may be desirable and preferred to reinforce the sealing area as well as entrap extruded thermoplastic laminant adhesive. To this end, a container generally indicated at 150 in FIGURE 16, having the same general construction as described in the embodiments shown in FIGURES 2 through 14, is provided with a container body 151 having a turned over or crimped top portion 157 for mechanically locking a closure member 153 to the container body before, during, or after the sealing operation. Although such container construction requires more complicated apparatus for turning over the top portion 157 of the container body 151, the advantages sometimes more than offset the additional cost involved. After application of adhesive activating conditions to the closure area, the contents in the container may be warmed or frozen without rupturing the seal.

In the various embodiments described heretofore the closure members are not an integral part of the container body. In the embodiments illustrated in FIGURES 17 through 21, the closure members are articulated to one of the wall panels. More specifically, and as shown in FIGURE 17, a container or erected carton, generally indicated at 170, comprises a carton body 171 having four standard wall panels and a bottom. Articulated to the wall panel 171a is a closure member 173, and articulated to the remaining wall panels are narrow flaps 172 folded inwardly at lines of articulation so as to be normal to their respective wall panels. As the following description proceeds it will become apparent that the narrow flaps 172 provide a sealing area and bearing edge for the closure member 173.

One or more slits 174 are provided circumferentially in the edge areas of the unarticulated sides of closure member 173 so as to be disposed over the bearing edge provided by narrow flaps 172 when in sealing engagement therewith. Upon the application of adhesive activating conditions, the thermoplastic laminant adhesive extrudes through the slits 174 and seals the closure member to the carton body.

Erected carton 180, as shown in FIGURE 18, is generally similar to the carton 170 including wall panels, bottom, narrow flaps articulated to the wall panels, and the articulated closure member 183. Instead of disposing the slits parallel to the top flap or closure edges, as illustrated in closure member 173 of FIGURE 17, the slits 184 are diagonally disposed in the circumferential edge areas of closure member 183 for providing the sealing area between the closure member 183 and the bearing edge provided by narrow flaps 182. Obviously the slits can be arranged in various patterns.

Carton 190 shown in FIGURE 19 is also generally similar to carton 170 of FIGURE 17. In this embodiment, carton 190 is provided with side flaps 192a and 192b and front flap 192c articulated to the wall panels. Junctures or flush butt joints 198 are formed between the side flaps and the front flap when they are folded inwardly and normal to the wall panels. The side and front flaps provide a bearing edge for sealing of the closure member (cover flap 193) to the container body. Closure member 193 is provided with additional diagonal slits 194a which overlie the junctures 198 when closure member 193 is in sealing engagement therewith. Thus, when the thermoplastic laminant adhesive is extruded from the slits in the closure member upon application of adhesive activating conditions, the adhesive seals the closure member 193 to the carton body and the narrow flaps to each other at their junctures 198.

FIGURES 20 and 21 show another form of the invention. The carton construction is generally similar to that shown in FIGURE 19 except that the side flaps are articulated to the front flap by webs 209. Such flap construction reinforces the top of the erected carton and forms a rigid bearing edge. FIGURE 20 shows the flaps 202 preparatory to folding and FIGURE 21 shows the flaps 202 in the folded position and the webbed corner junctures 208 therebetween. Upon application of adhesive activating conditions to the carton, after closure member 203 is in sealing engagement with the bearing edge of the carton body, adhesive is extruded through slits 204 and 204a for sealing the closure member to the carton body and the flaps to each other at their junctures 208. A single slit 204 may replace the two slits 204; alternatively an added slit may also be present in the circumferential edge areas of flap 203 or slits 204a may lie adjacent junctures 208.

The closure member and the carton body may be of the same construction, as when articulated thereto, or the closure member may be separate from the carton body. In such case, it is unnecessary that both the closure member and the carton body be of laminated material. As to an unarticulated closure member, it is a matter of choice as to whether the closure member and/or the container body are made of laminated sheet material. Moreover, it is to be understood that, although the laminated sheet materials employed in fabricating the closure members and/or the container bodies basically comprise two plies laminated to each other by thermoplastic laminant adhesive, additional sheets or plies may be included or suitably laminated thereto.

I have found it preferable to provide the necessary openings, usually in the form of slits or incisions, when desired for extrusion of the laminating adhesive used in the construction of my heat sealing containers, that is, in the container body and/or closure member, at some stage after the laminating step and before, during or after the formation of scores and cutouts and before, during, or after any backcutting or drawing, which is necessary or desired for the delineation of the closure member and/or container body, and preferably after the printing of any required indicia or artwork which must be in registry thereon. In this way the means for extrusion of the laminating adhesive are located in exactly the desired zones as required for the formation of the desired bond or seal, and laminant adhesive is not randomly extruded as would be the case if openings were placed in one or both of the plies in advance of the laminating step. Furthermore, due to the character of the slits provided and the amount of adhesive used as laminant, it is necessary that they be provided following the lamination step, as this prevents unwanted transfer of the molten hot melt used in the laminating step through the sheet prior to the moment of its intended use in sealing of the container.

It is apparent from the foregoing that either the closure member or the container body is constructed of laminated sheet material and that the other member may be and usually is constructed of a different material. One of the foremost advantages of the invention, especially as regards the novel closure members of laminated sheet material, is the wide variety of materials to which they can be effectively, even hermetically, sealed. Hermetic sealing is of course dependent upon imperviousness of both the closure member and the container body, as well as the seal therebetween, but can readily be effected according to the invention. When either the closure member or the container body is of laminated sheet material, the other member may be selected from a variety of thermoplastic or thermosetting materials such as polystyrene, polyethylene, polypropylene, cellulose acetate, phenolformaldehyde resins, melamine resins, et cetera, as well as glass, wood, paper or paperboard, metal, ceramics, wax-coated or dipped materials, e.g., wax coated trays, and the like, and numerous additional materials. The type of material is only limited in that it must be a material to which the extruded thermoplastic laminant will adhere in congealed or set condition, and the range of such materials is indeed very broad. Regardless of the materials used, it is preferred to maintain the sealed areas under at least minimal contact pressure during congealment or setting of the adhesive, as by cooling.

One preferred embodiment of the invention involves the forming, as by vacuum or stamping, of plastic or other sheet materials into continuous or semi-continuous strips, including sheets, of container bodies, filling the formed container bodies with the desired content, providing a continuous or semi-continuous strip, including sheet, of laminated sheet material of which closure members are to be constructed, said strips being with or without predetermined lines or zones of fracture as by means of perforations or cut scores, bringing the laminated sheet material into juxtaposition with the filled but uncovered pre-formed receptacles or container bodies while in strip form, and sealing the laminated closure member sheet material thereto, either before or after but preferably before severance of the strip into individual container bodies. When the container closure member is to be sealed against a bearing edge and upwardly turned extension thereof in the container body, the severance can be effected by means of a heated blade or series of blades, which extrude the thermoplastic laminant adhesive outwardly from the cut edges of the cover members during the severance. When a slit or slits are to be provided in the edge areas of the closure members, for sealing to a bearing edge of the container body, the laminated sheet material is provided with such openings in advance of bringing the sheet material and the preformed web of container bodies together, the closure member sheet with preformed openings is indexed or brought into register with the strip of container bodies, and the sealing by extrusion of laminant adhesive from the openings in the edge areas of the closure member is effected by means of a heated roll or blade or series of blades before or during severance of the strips into individual sealed containers.

Inasmuch as the functioning of the sealing and laminating adhesive of my cover or container body construction does not depend on the principle of differential migration by absorption, but rather on extrusion under heat or heat and pressure, the choice of sheet materials which may be used is quite broad, as they may be of equal or differing thicknesses and porosities. In general, I prefer to use a thinner sheet for one of the plies of the laminated sheet material which becomes the inner surface of the container or cover. A thicker sheet may form the inside surface of the container or cover. When the thicker sheet is placed on the side which will become the outside surface of the closure member and/or the container body, it will generally be a pigment coated paper or paperboard to provide a good printing surface and to obtain other advantages which will be hereinafter described. At least one ply of the laminated sheet material must have sufficient strength to provide structural rigidity, and ordinarily both plies will have sufficient strength for this purpose and will each extend about ten pounds per inch in tensile strength as determined by TAPPI method T404m. In some cases, the tensile strength of one or both sheets will be much higher when required for specific packaging applications. The thickness of the plies employed in the laminated sheet material will generally range from about .002 to about .016 inch, with a thickness of laminant from about .004 inch to about .015 inch but usually ranging from about .004 to about .008 inch. While the thickness of the plies as mentioned is usually from about .002 to .016 inch, I may employ paperboard sheet material as one ply of the laminated sheet which may have a thickness as great as .03 inch.

Any or all base sheet materials employed as stocks for production of the laminated sheet material may be treated in any of various ways, such as by printing, treating for grease-proofness or wax hold-out, glossing, and the like, and such treatment will ordinarily be applied prior to the laminating operation. Representative sheet materials include, in addition to paper and paperboard, parchment papers, papers containing foil mounted thereon, grease-proof papers, glassine papers, non-woven fabrics, and the like.

As further indicative of base material stocks suitable for employment in laminated sheet materials, there may be mentioned the usual paper or paperboard sheets, including sheets made on a cylinder machine or a multiple-headbox Fourdrinier machine, having a number of plies, or heavy paper sheets having only a single ply. Generally speaking, the base sheet stock may be any fibrous cellulosic or synthetic sheet, but in some cases may include foils or films as one ply thereof. Aluminum foil may sometimes advantageously be used for one ply, as when the ply is to become the inside or outside surface of the container or closure member. In such cases the aluminum foil may be and preferably is mounted on a light paper before gluing or laminating to a second fibrous ply, foil side in or out. For highest possible moisture-vapor proofness, these sheet stocks may be additionally proofed, including for example, dry waxed, semi-waxed, or surface waxed paperboard or paper materials, or polyethylene-coated materials, or the like. The containers and covers of the invention are fabricated of such laminated sheet materials, illustratively paperboard wax-laminated to paper, and will in general be fibrous sheets laminated to each other or to foils with suitable laminating materials as hereinafter more fully described.

In the sheet materials employed for the formation of my heat sealable and especially leakproof containers, the ability of the laminating adhesive to extrude through slits and raw edges provided in certain preselected areas of the container or closure member construction is essential. When a leakproof or hermetically sealed container is required, I have found that it is necessary to extrude laminating adhesive through such slits and edges in sufficient amount not only to heat seal at contiguous surfaces, but also to cover or block the raw cut edges of fibrous sheet materials used in the container construction to prevent migration by wicking of moisture, water-vapor, liquids, or greases through the closure or seams of the container construction. Likewise, even when a leakproof container is not required, as when a "tacked" or "tamper-proof" container is of interest, a satisfactory bond between the closure member and container body, e.g., at a bearing edge or an extension of said bearing edge, requires that a certain minimum quantity of thermoplastic laminant adhesive be present to provide the requisite bodies of adhesive, by extrusion through one or more extrusion paths in the container construction, which are necessary for a satisfactory degree of adhesion.

As thermoplastic laminant adhesive for uniting the plies of laminated sheet materials which are employed in producing the closure members and/or container bodies of the invention, the so-called hot-melt adhesives are preferred. Moisture-vapor-proof hot melt adhesives based on petroleum waxes are especially suitable, as these have a high degree of plasticity and flexibility. Hot melt adhesives based on microcrystalline waxes are especially preferred. Additional representative laminant adhesives include (A) microcrystalline waxes of any origin, e.g., Louisiana, Pennsylvania, or Mid-Continent origin, and/or paraffin waxes modified with: (1) synthetic polymers such as butyl rubber, polyisobutylene, polyethylene, copolymers of vinyl acetate and ethylene, (2) aluminum stearate, (3) hydrophilic adsorbents, (4) surface activators, (5) terpene resins, (6) ester gums, (7) rosin derivatives, and the like; (B) low molecular weight polymers such as (1) polystyrene of 4,000 to 20,000 M.W., (2) polyethylene of 2,000 to 12,000 M.W., (3) polyterpenes, (4) isoprene polymers, (5) chlorinated natural and synthetic rubbers, (6) natural rubbers, and the like; (C) cellulose derivatives such as (1) ethyl cellulose compositions and mixtures thereof with resins, waxes and plasticizers, (2) nitrocellulose thermoplastics, (3) cellulose acetates or other esters and mixtures thereof with resins and the like; all of which may be suitably modified with various other resins and with plasticizers, according to conventional knowledge and procedure of the art.

The thermoplastic adhesive employed in laminating the sheet materials should have the usual flow characteristics of a thermoplastic and may, for example, have a viscosity of at least about 75, and preferably at least about 150, centipoises in the range of from about ten degrees to about fifty degrees Fahrenheit above its softening point, e.g., at a temperature of about 220–270 degrees Fahrenheit, as measured by Brookfield Synchroelectric Viscometer or other rotational viscometer at a spindle speed less than ten r.p.m. As previously stated, hot melt compositions based on hydrocarbon and especially petroleum waxes are suitable, preferably those based on microcrystalline waxes, and these may be increased in viscosity by admixture therewith of viscosity builders such as polymers of ethylenically unsaturated hydrocarbons, natural gums, gelling agents, or a hydrous adsorbent powder in combination with a surface activator, especially inorganic gelling agents such as hydrated attapulgite or the like together with nitrogen-containing surface activators, especially fatty-acid amides and alkyl quaternary ammonium salts, or any other viscosity builder indicated previously. The latter type of wax composition, involving combinations of microcrystalline or other hydrocarbon waxes with hydrated adsorbents and long-chain paraffinic surface activators, such as the types mentioned, prepared by expulsion of water of hydration from the adsorbent in the presence of the surface activator, are disclosed in my copending U.S. patent application Serial No. 133,490, and are preferred because of their thixotropic properties, although it is not essential that these be employed as many others are suitable.

The density of the thermoplastic adhesives employed will ordinarily be from about 12 to about 25 or more pounds per ream (3,000 square feet) per each .001 inch of thickness thereof.

I have found that there is a limiting lower level of the amount or thickness of the thermoplastic laminant adhesive to be employed in the laminated sheet materials for the closure member and/or container body. This is the amount which allows adequate sealing by extrusion without undesirable delamination of the laminated sheet material. In general, I have found it desirable although not essential to have uninterrupted adhesive exceeding the thickness of the base ply of the laminated material around and through which the adhesive will be extruded. In any event the adhesive will usually be present in an amount of at least about fifty-five and preferably at least sixty pounds per ream (3,000 square feet). This latter amount is ordinarily sufficient to provide a thickness of laminant in excess of .004 inch. With this thickness, there is sufficient adhesive material to extrude through the openings provided in the ply or plies of the closure member and/or container body without delamination. This amount of adhesive is also sufficient to extrude out of the cut edges of the closure member and/or container body to seal the former to the latter or vice versa. Greater thicknesses of laminant adhesive, even exceeding the combined thickness of the base sheet materials, may be employed if desired.

I have moreover found the laminated sheet materials of my copending U.S. patent application, Serial No. 133,521, ideally suited for use in the construction of heat sealing containers according to the present invention.

In the heat sealing of containers of the present invention, it is also advantageous to provide a driving force to assist extrusion of the laminant adhesive into the desired locations for sealing of the container, especially when a hermetic seal is desired. Ordinarily, the extrusion may be accomplished by heat or heat and pressure alone, whether sealing with or without external support of the sealing area of a bearing edge, as by use of frames or mandrels. However, in certain instances, as in providing a top closure tack or seal for a filled container where the application of excessive pressure would distort the container, I have found it desirable to have a heat-activated driving force, such as a volatilizable material, present in the outside ply of the laminated sheet material, that is, in the ply opposite to the ply carrying the openings, if any, through which the extrusion of adhesive is desired. This driving force can ordinarily be simply provided by the addition of an aqueously or otherwise deposited coating, such as a clay and/or pigment bound by any one or more of various adhesives of the starch, casein, or latex variety. Certain inks may also be employed which contain or occlude volatile materials. It is also possible to include driving materials in the sheet material employed in the lamination during its production, as in the papermaking step, or to provide sufficiently high moisture content in the paper to provide the desirable driving force during heat sealing. During the heat-sealing step, such materials apparently assist by creation of sufficient vapor pressure to aid in extrusion and redistribution of the laminant adhesive without the application of excessive amounts of external force. Although I do not understand completely all the factors involved, I have found the inclusion of mineral clays in the outside ply or in the coating of the outside ply, which is the ply opposite to the ply provided with openings into the intercalated thermoplastic laminant adhesive layer, to be particularly effective. The provision of such a driving material is most simply and conveniently accomplished by including the same on or in a coating on the base sheet material which is to be the outer ply of the formed container. Mineral clays and/or pigments in combination with the base sheet materials are generally preferred in embodiments where the outer plies are of approximately equal thickness.

It is readily apparent that I have provided several different type containers which may be effectively and even hermetically sealed in a simple and facile manner whether filled with foodstuffs or the like on an assembly line of a processing plant or whether filled and sealed at establishments which usually do not have available the elaborate apparatus for sealing similar type containers heretofore available.

While in the foregoing description and drawings one of the container body and the container closure member has been referred to as the closure member and the other as the container body, it is apparent that by simple inversion of the components the container closure may in many instances become a container body and the container body may become a closure member. Which ever way the several components are regarded, the application of the principles of the present invention are the same, and reversal of the parts in the manner indicated is entirely within the scope and spirit of the invention.

Moreover, it is to be understood that the materials of construction employed for what is in the foregoing description and drawings designated a closure member may be employed instead as the materials of construction of the complementary container body and that the materials of construction shown or disclosed as being the materials of construction of the container body may be employed instead for the container closure member, so that the construction will remain the same but the materials of construction will be reversed.

According to a preferred embodiment of the invention, the container body is provided with a bearing edge for support of the container closure member. When the term "bearing edge" is employed herein, this is to be understood as meaning a surface or point of the container body which provides support for the container closure member when inserted into or placed onto the container body and which may in certain embodiments allow nesting of the closure member within a container body member.

One particularly advantageous adaptation of the present invention, involving a specific form or type of container, concerns a can comprising a can wall of laminated sheet material of the type hereinbefore described. The plies of the sheet material may advantageously be paper or paperboard for one ply and paper, paperboard, foil or film, or foil or film adhered to paper or paperboard, for a second ply. Also among the more advantageous materials of construction, especially for an inner ply, may be mentioned grease proofed sheet materials, dry waxed sheet materials, and plastic film sheet materials, although as previously indicated the type of sheet material which may be employed as a ply of the laminated sheet material is widely variable, and the foregoing are mentioned merely as representatively advantageous materials of construction. These plies are adhered to each other by thermoplastic laminant adhesive of the type hereinbefore described, and in the usual manner for effecting such laminations, again as hereinbefore described. The lamination of such sheet materials is productive of a laminated sheet material of the type hereinbefore described, in which the characteristics of the plies and the laminant and the laminated sheet material are all as hereinbefore described. Upon provision of the laminated sheet material, substantially parallelogrammatic or rectangular carton wall blanks are cut therefrom. At this point, the blanks may be appropriately scored, or they may be appropriately scored prior to or during cutting of the said can wall blanks. When scored, ordinarily two score lines will be provided, so as to allow the folding over of the can blank along first the one and then the other score line, to bring an edge area of the one folded portion of the blank into juxtaposition with an edge area of the other folded portion of the blank, so as to provide an area of overlap at which a seam may be effected. The blank may have more than two scores or folds if desired. Alternatively, in the area of overlap, one or more of the facing plies of the laminated sheet material of the can wall blank may also be provided with one or more openings, e.g., slits or cuts, into the intercalated thermoplastic laminant adhesive layer thereof, to allow heat sealing of the can wall blank to itself in the area of overlap, or one or more cuts into the intercalated thermoplastic adhesive layer may be provided in the inner ply of sheet material of the can wall blank adjacent the exposed cut edge of the seam, to allow extrusion of thermoplastic adhesive laminant out of said cut or cuts and over the exposed edge of said seam by the application of thermoplastic laminant adhesive activating conditions. As a still further alternative, scoring may be omitted entirely. When such slit or cut into the intercalated thermoplastic laminant adhesive layer is provided adjacent the exposed raw edge of the seam, this is conveniently done by backcutting, advantageously after providing the unscored or scored can wall blank. At this point, a scored and not yet folded can wall blank may be folded and seamed in the area of overlap employing either cold adhesive such as glue, or hot melt compositions, whether or not backcutting adjacent the exposed raw edge of the seam has been effected. When employing an unscored blank, it is advantageously formed into the desired configuration over a mandrel and seamed in the already indicated manner, without however prior folding of the blank upon itself. At this point, in any procedure, the seam may be heated or pressure or both heat and pressure applied thereto to extrude thermoplastic laminant adhesive therefrom and from any adjacently disposed opening provided by a prior backcutting operation, if any. A prescored and folded can wall blank may be erected by means of a mandrel or ring of the retaining type, whereupon any previously scored and folded areas can be heat treated to reestablish continuity of thermoplastic laminant adhesive in such areas and to restore a smooth exterior surface appearance to the previously folded areas. At this point, in any method of operation, the can bottom may be spun on or otherwise secured to the preformed can wall, using an unscored unfolded blank already formed on the mandrel or the scored and previously folded blank as just described. Ordinary can lids of metal, e.g., aluminum, tin plate, or the like, or of plastic, paper or paperboard, or of the same type of laminated material as used in construction of the can wall, may constitute the can bottom and/of top. The spinning on of the can bottom is effected in conventional manner, with or without the application of heat to extrude adhesive out of the cut edges of the can wall, thus to provide a thermoplastic adhesive laminant gasket in the area of sealing engagement between the can wall and the can bottom. Alternatively, crimping on of the can bottom using either a simple crimp or a double seam crimp or in any other manner conventional in the art for attaching can walls to can ends may be employed and, according to the invention, the pressure imparted by crimping alone is usually adequate to activate the thermoplastic adhesive laminant in the edge areas of the can wall and effect a self-gasketed closure between the can wall and the can end. When the can bottom has been effectively secured to the can wall, the desired contents may be introduced, and the can top spun or otherwise secured in conventional manner, again with or without heat or heat and pressure, and again activation may be adequately effected by the pressure imparted by the crimping operation alone, thereby effecting a self-gasketed seal between the can wall and the can top without the application of additional activating conditions. The filled, closed, and effectively gasketed cans may be then packed and stored or shipped or, alternatively, heat may be applied to both ends of the can momentarily for purposes of positive fluxing of the thermoplastic laminant adhesive to provide a more effective seal between the can wall and top and bottom thereof. The heating of both ends is especially significant when a hermetic seal is desired.

Such containers are extremely valuable in that the protective material of the can wall is not exposed on the inside to the contents, which among other things make such containers useful for materials which would abrade the inside surface coating of ordinary cans. The wax or other thermoplastic laminant adhesive material is highly compressive at the seam of the containers, which allows an almost flush joint at such point in the can wall upon application of minimal pressure thereto. The cans have a high crush resistance and degree of protectiveness, and can be made water-proof and water-vapor proof and even hermetically sealed if desired. When scored and folded, and then erected, according to the invention, the can wall of the present invention may be caused to "lose its memory" and reassume an uninterruptedly smooth exterior surface even in the area of previous folding by the application of heat to the previously scored and folded areas, so that there is no or practically no springback apparent after this step despite previous scoring, folding and unfolding during erection of the can wall. This is especially important when the cans are of other than circular cross section. Cans produced in the aforesaid manner have been tested and found to be not only extremely durable and crushproof, but to provide very high protective properties and to exhibit high water-proof and water-vapor proof characteristics, and even hermetic characteristics, when produced from otherwise impervious materials of construction for the can ends. Representative cans made according to the invention and filled with anhydrous calcium chloride have shown no weight gain due to water-vapor transmission after weeks of exposure at 50% related humidity at 73° F.

Figure 16:
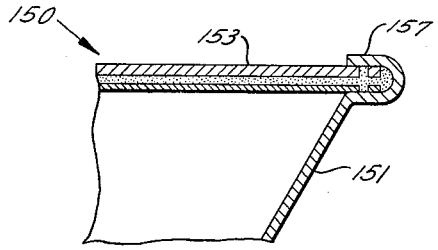
FIGURE 16 is an enlarged fragmentary vertical section taken along line XVI—XVI of FIGURE 15.

As previously stated, ordinary can lids are suitable for can end closure members. These are usually provided with flanges to be inserted into the tubular can wall structure for affixing the closure member thereto prior to crimping and/or sealing, all as well known in the art. A can end closure member may also be provided with a flange and bead, as shown in FIGURE 16, rather than a flange and crimp. The can wall may also be sealed to the end closure member by means comprising slits in one or more plies thereof, also as shown in FIGURE 16.

While activation of the thermoplastic laminant adhesive has been illustrated and disclosed by use of heat, heat and pressure, and even pressure alone in certain circumstances, after the cover member and container body are in sealing engagement, it is to be understood that in some instances the activation may be just before or concurrent with closing of the container as well as after, as by momentary application of high temperature, but in such case application of at least minimal pressure after closing, e.g., after the members are in sealing engagement, is still preferred.

It will be apparent to one skilled in the art that the present invention may be embodied in other specific forms without departing from the spirit or essential attributes thereof.

It is therefore desired and intended that the several embodiments herein specifically set forth be considered in all respects as illustrative and not restrictive, reference being made to the appended claims rather than the foregoing description and drawings to indicate the scope of the invention, which is to be understood as limited only by the scope of the appended claims.

I claim:

1. A container member selected from the group consisting of container closure members and container body members, adapted for use in conjunction with a complementary container body or closure member, constructed of plies of sheet material at least two of which plies have a thickness of at least about .002 inch each laminated together with thermoplastic laminant adhesive, having an avenue of exit in its edge areas for extrusion of thermoplastic laminant adhesive from its normal location between the plies into contact with the complementary container member in areas of sealing engagement therewith, upon application of thermoplastic laminant adhesive activating conditions, selected from heat, pressure, and heat and pressure, when said complementary container body and closure members are placed in sealing engagement, said laminated sheet material of construction of the container member constructed thereof containing at least about 55 lbs. of thermoplastic laminant adhesive per 3,000 sq. feet of laminated sheet material between its plies to allow such extrusion without delamination of said container member formed therefrom.

2. An unarticulated container closure member adapted for use in conjunction with a container body member, constructed of plies of sheet material at least two of which plies have a thickness of at least about .002 inch each laminated together with thermoplastic laminant adhesive, having an avenue of exit in its edge areas for extrusion of thermoplastic laminant adhesive from its normal location between the plies into contact with said container body in areas of sealing engagement, upon application of thermoplastic laminant adhesive activating conditions, selected from heat, pressure, and heat and pressure, when said container closure member is in sealing engageemnt with said container body member, said laminated sheet material of construction of said closure member containing at least about 55 lbs. of thermoplastic laminant adhesive per 3,000 sq. feet of laminated sheet material between its plies to allow such extrusion without delamination of said container closure member.

3. A container closure member of claim 2, wherein an avenue of exit in said edge areas is the cut edge of said laminated container closure member.

4. A container closure member of claim 2, wherein at least one circumferentially disposed slit is present in at least one of the outer plies of said closure member extending completely around the periphery of said closure member.

5. In combination, a container body member and an unarticulated container closure member adapted for sealing engagement therewith, at least one of said members being constructed of laminated sheet material and having an avenue of exit in its edge areas for extrusion of thermoplastic laminant adhesive from its normal location between the plies thereof and into contact with said other member in areas of sealing engagement for sealing of the members to each other, upon application of thermoplastic laminant adhesive activating conditions when said container closure member is in sealing engagement with said container body member, said laminated sheet material containing between the plies thereof sufficient thermoplastic laminant adhesive to allow such extrusion upon application of thermoplastic laminant adhesive activating conditions without delamination of the member constructed of said laminated sheet material.

6. The combination of claim 5, wherein the container closure member and the container body member are sealed to each other.

7. The combination of claim 5, wherein the container closure member is constructed of said laminated sheet material and the avenue of exit in said edge areas is the cut edge of said laminated closure member.

8. The combination of claim 5, wherein the container closure member is constructed of said laminated sheet material and said closure member is in contact with a bearing edge of said container body member and is secured to said container body by thermoplastic laminant adhesive extruded from the cut edge of said container closure member.

9. In combination, a container body and an unarticulated container closure member, said container body having a bearing edge for support of said closure member, said closure member being constructed of laminated sheet material comprising a plurality of plies at least two of which have a thickness of at least about .002 inch each and being provided with an avenue of exit of thermoplastic laminant adhesive from its normal location between the plies and into contact with said container body when said container closure member is in sealing engagement with said container body, the laminated sheet material of said closure member containing at least about 55 lbs. of thermoplastic adhesive laminant per 3,000 sq. feet of laminated sheet material between its plies to permit extrusion thereof through said avenue of exit and into the area of sealing engagement with said container body member upon application of thermoplastic adhesive laminant activating conditions, selected from heat, pressure, and heat and pressure, without delamination of said closure member, said avenue of exit comprising at least one circumferentially disposed slit in an outer ply of said closure member in edge areas thereof which oppose the bearing edge of said container body member when in sealing engagement therewith.

10. The combination of claim 9, wherein said avenue of exit comprises at least one slit completely circumferentially extending around said container closure member in spaced relation to the edge thereof.

11. The combination of claim 9, wherein said avenue of exit comprises a series of slits circumferentially disposed, said series of slits extending completely circumferentially around said container closure member in spaced relation to the edge thereof.

12. In combination, a container body having an unarticulated container closure member in sealing engagement therewith, said container body being formed from a laminated sheet material comprising at least two plies of sheet material adhesively bonded by at least fifty-five pounds, per three thousand square foot ream, of a thermoplastic adhesive laminant, and having an avenue of exit in edge areas thereof which engage said closure member for extrusion of said thermoplastic adhesive into contact with said closure member upon application of adhesive activating conditions.

13. A container comprising a container body having an outwardly extending peripheral flange at the open top thereof, a laminated closure member, having an outer and inner ply of sheet material, supported by said flange, the outer ply of said closure member being provided with lines of severance to define a tear-out section, a window in said closure member disposed below said lines of severance, and a thermoplastic laminant adhesive intermediate the outer ply and the inner ply of said closure member adjacent its edges, whereby upon application of adhesive activating conditions said closure member is sealed to the flange of said container body by extrusion of said laminant adhesive through an opening in the edge areas of said closure member, said adhesive being present in sufficient amount to allow such extrusion without delamination of said closure member.

14. A container comprising a container body having a bottom and wall panels, a laminated closure member constructed of plies of sheet material, at least two of which plies have a thickness of at least about .002 inch each, articulated to one of said panels, and a thermoplastic laminant adhesive intermediate the plies of said closure member whereby upon application of adhesive activating conditions said closure member is sealed to said container body by extrusion of said adhesive through an opening in the edge areas of said closure member, said adhesive being present in amount at least about 55 pounds of thermoplastic laminant adhesive per 3000 square feet of laminated sheet material, to allow such extrusion without delamination of said closure member, at least said closure member being so laminated.

15. A container comprising a container body having a bottom and front, side, and rear wall panels, a plurality of flaps articulated to said front and side wall panels, a laminated closure member constructed of plies of sheet material, at least two of which plies have a thickness of at least about .002 inch each, articulated to said rear wall panel and having its edge areas in sealing engagement with said flaps, and a thermoplastic adhesive interposed between the plies of said closure member, the unarticulated edge areas of said closure member being provided with at least one circumferentially disposed slit through which said thermoplastic adhesive is extruded for sealing said closure member to said container body, the amount of thermoplastic adhesive laminant being at least about 55 pounds of thermoplastic laminant adhesive per 3000 square feet of laminated sheet material, to allow such extrusion without delamination of said closure member, at least said closure member being so laminated.

16. The container of claim 15, wherein said closure member is provided with a series of circumferentially disposed slits.

17. The container of claim 15, wherein said closure member is provided with diagonal slits corresponding to diagonal junctures between flaps.

18. A laminated sheet material suitable for production of individual container closure members, the said laminated sheet material being comprised of a plurality of plies at least two of which have a thickness of at least about .002 inch each and provided with avenues of exit in a predetermined pattern and in predetermined areas in a ply thereof so as to correspond with bearing edges of container bodies to be sealed thereto when brought into sealing engagement therewith, said laminated sheet material containing at least about 55 lbs. of thermoplastic laminant adhesive per 3,000 sq. feet of laminated sheet material between its plies to permit extrusion therefrom through said avenues of exit into contact with said bearing edges of said container bodies when in sealing engagement therewith, upon application of thermoplastic laminant adhesive activating conditions, without delamination of said laminated sheet material or said individual cover members upon severance.

19. The sheet material of claim 18, wherein said avenues of exit comprise a series of recurring openings into the intercalated thermoplastic laminant adhesive layer of said sheet material, each unit of the series involving one or more slits which will oppose bearing edges of a container body when closure members of said sheet material are in sealing engagement with container bodies, whether in sheet or individual form.

20. A sheet material of claim 18, having a plurality of container bodies sealed thereto.

21. A container comprising a container end closure member and a tubular container wall in sealing engagement therewith, said container wall being constructed of plies of sheet material laminated together with thermoplastic laminant adhesive, said end closure member being affixed to said tubular container wall and being gasketed thereto by means of thermoplastic laminant adhesive extruded out of the cut edges of said tubular container wall and into contact with said end closure member in areas of sealing engagement between said tubular container wall and said end closure member, the amount of thermoplastic laminant adhesive contained in the material of construction of said tubular container wall being sufficient to allow such extrusion without delamination of the tubular container wall.

22. The container of claim 21, wherein said tubular container wall is sealed and gasketed at both ends thereof to end closure members.

23. The container of claim 21, wherein said tubular container wall is constructed of laminated sheet material containing at least about fifty-five pounds of thermoplastic laminant adhesive per 3,000 square foot ream.

24. A container comprising a tubular container body having a laminated wall, the plies of said wall having a porosity in excess of ten seconds, a thermoplastic adhesive interposed between the plies of said wall in excess of about fifty-five pounds per ream, and a closure member in sealing engagement with the end of said container body, said closure member including a flange overlying the cut edges of said laminated wall and gasketed thereto by adhesive extruded through the cut edges of said wall.

25. A container comprising a container body member having a wall defining an opening thereof, and a closure member closing the opening of said container body member, one of said members being constructed of a non-fibrous material and the other of said members being constructed of a laminated fibrous sheet material comprised of a plurality of plies and an intercalated thermoplastic adhesive, said laminated member being provided with an avenue of exit in its edge areas for extrusion of said thermoplastic adhesive from its normal location between said plies and into contact with said other member upon application of adhesive-activating conditions, said laminated sheet material containing sufficient thermoplastic laminant adhesive between the plies thereof to allow such extrusion and sealing without delamination of the plies of said laminated member.

26. A container comprising a container body member having a wall defining an opening and a closure member closing said opening, one of said members being constructed of a plastic material and the other of said members being constructed of a laminated fibrous sheet material comprised of a plurality of plies and an intercalated thermoplastic adhesive layer, said laminated member being provided with an opening for extrusion of said adhesive therethrough upon application of adhesive-activating conditions, said adhesive being present in an amount sufficient to permit extrusion and sealing without delamination of said laminated member.

27. The container of claim 26 wherein said closure member is constructed of laminated fibrous sheet material and nests upon a bearing edge of said container body and is secured to said container body by thermoplastic laminant adhesive extruded from the cut edge of said closure member.

28. The container of claim 26, wherein said closure member is constructed of laminated fibrous sheet material and wherein said avenue of exit constitutes one or more circumferentially disposed openings in an outer ply of said closure member in edge areas thereof, said openings being opposed to a bearing edge of said container body and in sealing engagement therewith.

29. The container of claim 26, wherein said closure member is constructed of laminated fibrous sheet material and wherein said avenue of exit constitutes both the cut edge of said closure member and one or more circumferentially disposed openings in an outer ply of said closure member in edge areas thereof and extending entirely around the periphery of said closure member, said cut edge and said opening being in sealing engagement with said container body.

30. A container combination comprising a container body having a bottom and an upwardly extending peripheral wall to define an opening at its top, a laminated closure member in sealing engagement with the top of said container body, and a thermoplastic adhesive disposed between the plies of said closure member, whereby upon application of adhesive-activating conditions, said closure member is sealed to said container body by extrusion of said adhesive through an opening in the edge areas of said closure member, said adhesive laminant being present in said closure member in sufficient amount to allow such extrusion without delamination of said closure member, and wherein the upper end portion of the wall of the container body overlies edge areas of said closure member for entrapping extruded adhesive.

31. The container member of claim 1 wherein the laminated sheet material comprises at least one material selected from the group consisting of paper and paperboard.

32. The container of claim 24 wherein the laminated wall has an over-all thickness of at least .008 inch and the plies of said wall include at least two sheets which are individually at least .002 inch thick, at least one of which comprises a material selected from the group consisting of paper and paperboard.

(References on following page)

References Cited by the Examiner

UNITED STATES PATENTS

| | | | |
|---|---|---|---|
| 2,141,556 | 12/38 | Reifsnyder | 229—3.1 X |
| 2,185,604 | 1/40 | Moore. | |
| 2,293,589 | 8/42 | Calvert. | |
| 2,415,387 | 2/47 | Graebner. | |
| 2,474,619 | 6/49 | Farrell. | |
| 2,875,563 | 3/59 | Moore | 53—39 |
| 2,940,230 | 6/60 | Elax | 53—39 |
| 3,010,639 | 11/61 | Govatsos | 229—48 |
| 3,017,067 | 1/62 | Parks | 229—48 |
| 3,062,432 | 11/62 | Jacke. | |
| 3,079,057 | 2/63 | Colarusso. | |

GEORGE O. RALSTON, *Primary Examiner.*

EARLE J. DRUMMOND, *Examiner.*